(12) United States Patent
Krzych et al.

(10) Patent No.: US 9,936,345 B1
(45) Date of Patent: *Apr. 3, 2018

(54) METHOD AND SYSTEM FOR CONTENT DELIVERY WITH A BEACON

(71) Applicant: Estimote Polska Sp. z o. o., Cracow (PL)

(72) Inventors: Jakub Krzych, Cracow (PL); Lukasz Kostka, Cracow (PL)

(73) Assignee: Estimote Polska Sp. z o. o., Cracow (PL)

( * ) Notice: Subject to any disclaimer, the term of this patent is extended or adjusted under 35 U.S.C. 154(b) by 0 days.

This patent is subject to a terminal disclaimer.

(21) Appl. No.: 15/829,800

(22) Filed: Dec. 1, 2017

Related U.S. Application Data

(63) Continuation of application No. 15/644,428, filed on Jul. 7, 2017, now Pat. No. 9,866,996.

(60) Provisional application No. 62/416,344, filed on Nov. 2, 2016, provisional application No. 62/359,543, filed on Jul. 7, 2016.

(51) Int. Cl.
*H04W 24/00* (2009.01)
*H04W 4/02* (2018.01)
*H04L 29/12* (2006.01)
*H04W 84/18* (2009.01)

(52) U.S. Cl.
CPC ............ *H04W 4/02* (2013.01); *H04L 61/308* (2013.01); *H04W 84/18* (2013.01)

(58) Field of Classification Search
CPC ..... H04W 84/18; H04W 12/06; H04W 48/16; H04W 64/00; H04W 4/02; H04W 4/008; H04W 4/021; H04W 4/001; H04L 63/10; H04L 29/08; H04L 67/02; H04L 61/308; G01S 5/0236; G01S 5/0284; G01S 5/0242; G01S 5/0252; G07C 2009/00769; G08B 1/08
USPC ...................... 455/456.1, 456.6, 434, 456.3; 340/539.13, 8.1; 709/224
See application file for complete search history.

(56) References Cited

U.S. PATENT DOCUMENTS

| | | | |
|---|---|---|---|
| 6,091,358 A | 7/2000 | Maniscalco et al. | |
| 6,873,258 B2 | 3/2005 | Marples et al. | |
| 7,027,808 B2 | 4/2006 | Wesby | |
| 7,038,584 B2 * | 5/2006 | Carter | G01S 5/0036 340/539.13 |
| 7,072,671 B2 | 7/2006 | Leitch | |
| 7,283,846 B2 | 10/2007 | Spriestersbach et al. | |
| 7,312,752 B2 | 12/2007 | Smith et al. | |

(Continued)

FOREIGN PATENT DOCUMENTS

| | | | | |
|---|---|---|---|---|
| WO | WO 0221429 A3 * | 8/2002 | ......... | G06K 7/10237 |
| WO | 021429 | 3/2003 | | |

(Continued)

*Primary Examiner* — Mahendra Patel
(74) *Attorney, Agent, or Firm* — Jeffrey Schox; Diana Lin

(57) ABSTRACT

Embodiments of a method and system for improving delivery of content to a user device can include: determining a resource identifier comprising beacon data associated with a beacon, wherein the resource identifier is associated with a content identifier identifying the content; broadcasting the resource identifier from the beacon to the user device; processing a resource request from a verifying entity, the resource request associated with the resource identifier; and transmitting a response to the resource request based on the first content identifier.

17 Claims, 5 Drawing Sheets

(56) References Cited

U.S. PATENT DOCUMENTS

| | | | |
|---|---|---|---|
| 7,458,825 B2 | 12/2008 | Atsmon et al. | |
| 7,499,462 B2 | 3/2009 | MacMullan et al. | |
| 7,639,131 B2 | 12/2009 | Mock et al. | |
| 7,835,505 B2 | 11/2010 | Toyama et al. | |
| 7,855,679 B1 | 12/2010 | Braiman | |
| 7,983,677 B2 | 7/2011 | DaCosta | |
| 8,058,988 B1* | 11/2011 | Medina, III | G08B 21/0238 340/539.1 |
| 8,139,945 B1 | 3/2012 | Amir et al. | |
| 8,260,320 B2 | 9/2012 | Herz | |
| 8,265,621 B2 | 9/2012 | Kopikare et al. | |
| 8,489,112 B2 | 7/2013 | Roeding et al. | |
| 8,520,648 B2 | 8/2013 | Cordeiro | |
| 8,559,975 B2 | 10/2013 | Lin et al. | |
| 8,594,850 B1 | 11/2013 | Gourlay et al. | |
| 8,612,604 B2 | 12/2013 | Beatty et al. | |
| 8,644,255 B1 | 2/2014 | Burcham | |
| 8,694,060 B2 | 4/2014 | Vanderaa et al. | |
| 8,694,782 B2 | 4/2014 | Lambert | |
| 8,781,502 B1 | 7/2014 | Middleton | |
| 8,791,901 B2 | 7/2014 | Mallinson | |
| 8,797,214 B2 | 8/2014 | Taylor et al. | |
| 8,844,007 B2* | 9/2014 | Vicente | A61B 5/002 455/41.3 |
| 8,847,754 B2 | 9/2014 | Buchheim et al. | |
| 8,867,993 B1 | 10/2014 | Perkins et al. | |
| 8,868,133 B1* | 10/2014 | Rosenbaum | H04W 64/00 455/456.1 |
| 8,934,389 B2 | 1/2015 | Kuehnel et al. | |
| 8,938,196 B2 | 1/2015 | Bradish et al. | |
| 8,965,398 B2* | 2/2015 | Zhu | H04W 24/00 370/338 |
| 8,971,850 B2 | 3/2015 | Klein et al. | |
| 8,988,221 B2 | 3/2015 | Raji et al. | |
| 8,996,030 B2 | 3/2015 | Grainger et al. | |
| 9,014,715 B2 | 4/2015 | Alizadeh-Shabdiz et al. | |
| 9,033,255 B2 | 5/2015 | Tessier et al. | |
| 9,036,792 B2 | 5/2015 | Cacioppo et al. | |
| 9,063,212 B2 | 6/2015 | Jones, Jr. | |
| 9,113,309 B2 | 8/2015 | Uilecan et al. | |
| 9,113,343 B2 | 8/2015 | Moshfeghi | |
| 9,140,796 B2 | 9/2015 | Zhou | |
| 9,154,565 B2 | 10/2015 | Monighetti | |
| 9,202,245 B2 | 12/2015 | Kostka et al. | |
| 9,258,674 B2 | 2/2016 | Chen | |
| 9,282,436 B2 | 3/2016 | Chitre et al. | |
| 9,282,582 B1 | 3/2016 | Dunsbergen et al. | |
| 9,307,355 B2 | 4/2016 | Nehrenz et al. | |
| 9,351,114 B2 | 5/2016 | Chatterjee et al. | |
| 9,361,630 B1 | 6/2016 | Goswami | |
| 9,408,060 B2 | 8/2016 | Helms et al. | |
| 9,424,699 B2 | 8/2016 | Kusens et al. | |
| 9,471,917 B2 | 10/2016 | Govindarajan et al. | |
| 9,474,962 B2 | 10/2016 | Barney et al. | |
| 9,491,575 B2* | 11/2016 | Edge | H04W 72/1263 |
| 9,558,507 B2 | 1/2017 | Zilkha | |
| 9,571,957 B2 | 2/2017 | Granbery | |
| 9,591,570 B2 | 3/2017 | Kubo et al. | |
| 9,621,446 B2* | 4/2017 | Pugh | H04L 67/22 |
| 9,622,046 B2 | 4/2017 | Otis et al. | |
| 9,622,208 B2 | 4/2017 | Mycek et al. | |
| 9,642,173 B2 | 5/2017 | Granbery | |
| 9,652,124 B2 | 5/2017 | Cotier et al. | |
| 9,689,955 B2 | 6/2017 | Rosenbaum | |
| 2003/0100315 A1 | 5/2003 | Rankin | |
| 2006/0163349 A1 | 7/2006 | Neugebauer | |
| 2006/0290519 A1 | 12/2006 | Boate et al. | |
| 2008/0068519 A1 | 3/2008 | Adler et al. | |
| 2008/0139306 A1 | 6/2008 | Lutnick et al. | |
| 2008/0143516 A1* | 6/2008 | Mock | G01S 5/0294 340/539.14 |
| 2008/0231460 A1 | 9/2008 | Owen et al. | |
| 2009/0005079 A1 | 1/2009 | Shields et al. | |
| 2009/0131079 A1 | 5/2009 | Sekhar | |
| 2009/0327135 A1 | 12/2009 | Nguyen et al. | |
| 2010/0019924 A1* | 1/2010 | D'Alessandro | G01S 5/0289 340/8.1 |
| 2010/0099435 A1 | 4/2010 | Druzinic-Fiebach et al. | |
| 2010/0317371 A1 | 12/2010 | Westerinen et al. | |
| 2011/0029359 A1 | 2/2011 | Roeding et al. | |
| 2011/0238188 A1 | 9/2011 | Washiro | |
| 2012/0095805 A1 | 4/2012 | Ghosh et al. | |
| 2012/0172055 A1* | 7/2012 | Edge | G01S 5/0018 455/456.1 |
| 2012/0190386 A1 | 7/2012 | Anderson | |
| 2012/0258730 A1 | 10/2012 | Tinnakornsrisuphap et al. | |
| 2012/0280862 A1* | 11/2012 | Moffatt | G01S 13/765 342/386 |
| 2012/0309256 A1 | 12/2012 | Theodore | |
| 2012/0316960 A1 | 12/2012 | Yang | |
| 2013/0030915 A1 | 1/2013 | Statler et al. | |
| 2013/0065584 A1* | 3/2013 | Lyon | H04W 28/06 455/434 |
| 2013/0225197 A1* | 8/2013 | McGregor | G01S 1/68 455/456.1 |
| 2014/0087758 A1 | 3/2014 | Maor | |
| 2014/0122855 A1 | 5/2014 | Maneval | |
| 2014/0148196 A1 | 5/2014 | Bassan-Eskenazi et al. | |
| 2014/0220883 A1 | 8/2014 | Emigh et al. | |
| 2014/0277654 A1 | 9/2014 | Reinhardt et al. | |
| 2015/0058355 A1 | 2/2015 | Naqvi | |
| 2015/0081474 A1 | 3/2015 | Kostka et al. | |
| 2015/0106196 A1 | 4/2015 | Williams et al. | |
| 2015/0163828 A1 | 6/2015 | Vandwalle et al. | |
| 2015/0276432 A1 | 10/2015 | Repyevsky et al. | |
| 2015/0279115 A1 | 10/2015 | Vukicevic | |
| 2015/0296048 A1 | 10/2015 | Gerding et al. | |
| 2015/0334548 A1 | 11/2015 | Liu et al. | |
| 2015/0351008 A1 | 12/2015 | Mayor | |
| 2016/0014609 A1 | 1/2016 | Goel et al. | |
| 2016/0063550 A1 | 3/2016 | Caldwell | |
| 2016/0086460 A1 | 3/2016 | King et al. | |
| 2016/0094598 A1 | 3/2016 | Gedikian | |
| 2016/0099758 A1 | 4/2016 | Bell et al. | |
| 2016/0127875 A1* | 5/2016 | Zampini, II | H04W 4/043 370/311 |
| 2016/0188919 A1 | 6/2016 | Gao et al. | |
| 2016/0192407 A1 | 6/2016 | Fyfe et al. | |
| 2016/0277999 A1* | 9/2016 | Graves | H04W 40/244 |
| 2016/0291127 A1 | 10/2016 | Huang et al. | |
| 2017/0019765 A1 | 1/2017 | Hoyer et al. | |
| 2017/0079001 A1 | 3/2017 | Lewis | |

FOREIGN PATENT DOCUMENTS

| | | |
|---|---|---|
| WO | 135432 | 11/2008 |
| WO | 026862 | 2/2015 |
| WO | 043388 | 3/2016 |
| WO | 040690 | 3/2017 |

* cited by examiner

METHOD AND SYSTEM FOR CONTENT DELIVERY WITH A BEACON

CROSS-REFERENCE TO RELATED APPLICATIONS

This application is a continuation of U.S. application Ser. No. 15/644,428 filed 7 Jul. 2017, which claims the benefit of U.S. Provisional Application No. 62/416,344 filed 2 Nov. 2016 and U.S. Provisional Application No. 62/359,543 filed 7 Jul. 2016, each of which is incorporated in its entirety by this reference.

This application is related to U.S. application Ser. No. 15/590,939 filed 9 May 2017, which claims the benefit of U.S. Provisional Application No. 62/334,115 filed 10 May 2016 and U.S. Provisional Application No. 62/416,395 filed 2 Nov. 2016, and which is a continuation in part of U.S. application Ser. No. 15/446,165 filed 1 Mar. 2017, which is a continuation of U.S. application Ser. No. 15/253,376, filed 31 Aug. 2016, which claims the benefit of U.S. Provisional Application No. 62/213,467 filed 2 Sep. 2015, each of which is incorporated in their entireties by this reference.

This application is additionally related to U.S. application Ser. No. 15/620,014 filed 12 Jun. 2017, which is a continuation of U.S. patent Ser. No. 15/288,302, filed 7 Oct. 2016, which is a continuation of U.S. patent application Ser. No. 14/956,209, filed 1 Dec. 2015, which is a continuation of U.S. patent application Ser. No. 14/463,582, filed on 19 Aug. 2014, now issued as U.S. Pat. No. 9,202,245, which claims the benefit of U.S. Provisional Application No. 61/867,493, filed on 19 Aug. 2013 and to U.S. Provisional Application No. 61/867,498, filed on 19 Aug. 2013, each of which is incorporated in their entireties by this reference.

TECHNICAL FIELD

This invention relates generally to the wireless communication field, and more specifically to a new and useful method and system for providing content in the wireless communication field.

DESCRIPTION OF THE PREFERRED EMBODIMENTS

Figure 1:
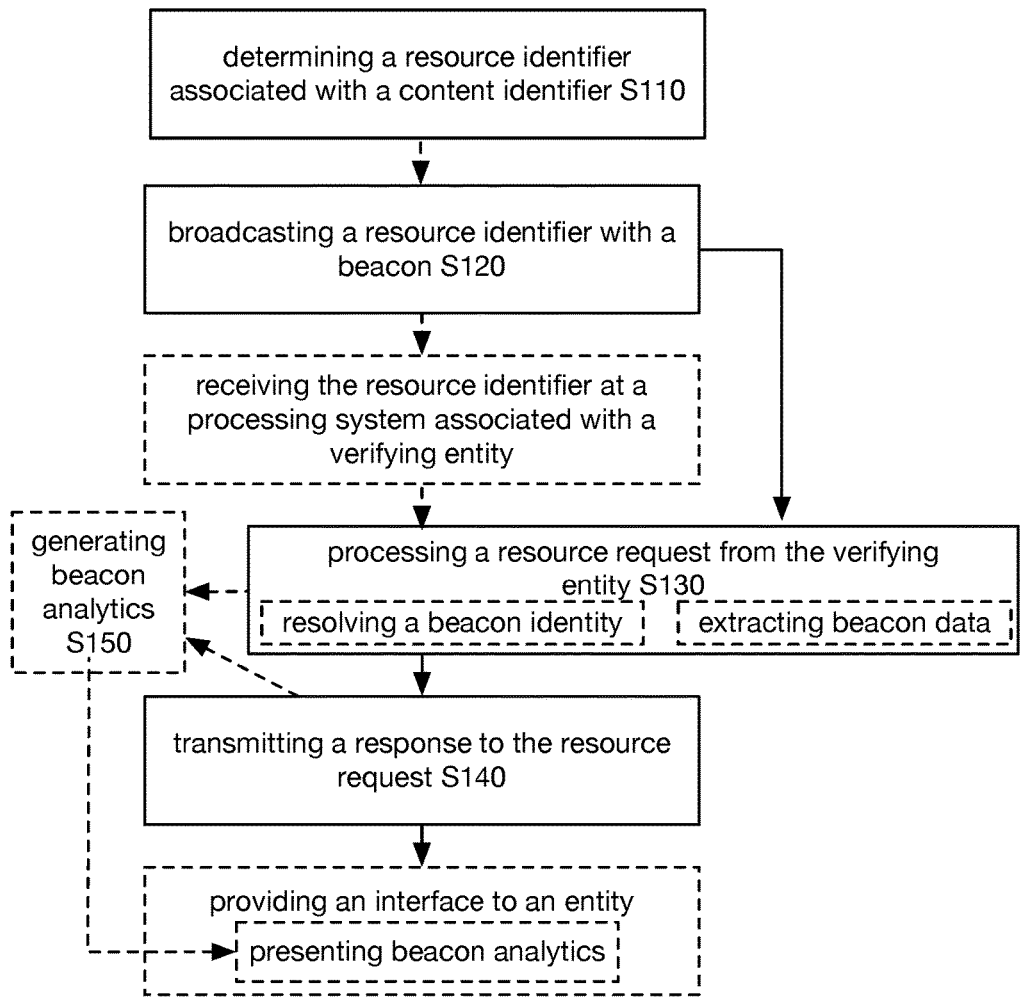
FIG. 1 is a schematic representation of a variation of the method.

The following description of the preferred embodiments of the invention is not intended to limit the invention to these preferred embodiments, but rather to enable any person skilled in the art to make and use this invention.

1. Overview.

As shown in FIGS. 1-3 and 5, embodiments of a method 100 for delivery of content to a user device can include: determining a resource identifier including beacon data associated with a beacon, where the resource identifier is associated with a content identifier identifying the content S110; broadcasting the resource identifier from the beacon to the user device S120; processing a resource request from a verifying entity, the resource request associated with the resource identifier S130; and transmitting a response to the resource request based on the first content identifier S140. Embodiments of the method 100 can additionally or alternatively include generating beacon analytics S150, providing an interface to an entity, and/or other suitable processes.

The method 100 functions to leverage beacon technology to facilitate centralized control (e.g., at a remote beacon control system) of content (e.g., contextualized content) delivered to user devices. The method 100 can additionally or alternatively function to dynamically modify resource identifiers (e.g., broadcasted by a beacon) to collect beacon data (e.g., sensor data, traffic data) for generating beacon analytics, to increase security, and/or for other suitable purposes. Further, the method 100 can optionally function to enable a first party (e.g. a beacon manufacturer, an entity developing software executable by a beacon, etc.) to centrally manage content deliverable to user devices in order to ensure compliance with verifying entities (e.g., an entity that verifies the legitimacy of content before delivery to the user, a web browser, a network administrator, an internet service provider, etc.).

An example of a first party includes Estimote™, or any other suitable entity associated with a system that the content requests are routed through, and/or other suitable entities. An example of a verifying entity is Google™, accessible through Google's Physical Web™. As such, beacon owners (e.g., an entity controlling a beacon, beacon permissions, etc.) can confidently manage deployed beacons and delivered content remotely, such as at a beacon owner interface. For example, merchants (e.g., Target™) can be a beacon owner and own one or more sets of beacons. Content providers can create and dynamically manage beacon campaigns (e.g., for delivering content) remotely, such as at a content provider interface and/or content provider device. Content providers can include any of: an entity providing content to be served to a user, a beacon owner, a secondary entity (e.g., an entity associated with the beacon owner and serving content by leveraging beacons of the beacon owner), a content provider device, an entity associated with the physical space, merchant, and/or product, and/or any other suitable entity. For example, content providers can include advertising entities, product companies (e.g., Coke™), or other entities. Further, users (e.g., an individual associated with a user device communicating with beacons, a customer interfacing with beacons located at a retail store, etc.) can receive content (e.g., associated with a beacon) at a user device without the user device needing to download any particular application.

The method 100 is preferably implemented with systems described in U.S. application Ser. No. 15/253,376, filed 31 Aug. 2016, and U.S. application Ser. No. 14/463,582, filed 19 Aug. 2014, which are incorporated in their entireties by this reference, but can be additionally or alternatively implemented with one or more: beacons, processing systems (e.g., remote systems) associated with first parties, beacon owners, content providers, verifying entities, and/or other suitable entities, and/or any other suitable components. The method 100 and system 200 can optionally be applied to applications independent of beacon technology.

One or more instances and/or portions of the method 100 and/or processes described herein can be performed asynchronously (e.g., sequentially), concurrently (e.g., in parallel; concurrently on different threads for parallel computing to improve system processing ability; etc.), in temporal relation to a condition, and/or in any other suitable order at any suitable time and frequency by and/or using one or more instances of the system 200, elements, and/or entities described herein. However, the method 100 and/or system 200 can be configured in any suitable manner.

2. Benefits.

The technology can confer several benefits over conventional systems. First, the technology can include processes necessarily rooted in computer technology for overcoming problems specifically arising in the realm of computer networks (e.g., Internet technology). In an example, the technology can enable dynamic generation of resource identifiers (e.g., URLS associated with a first party Internet domain, etc.) based on content identifiers (e.g., URLS associated with a content provider Internet domain, etc.) using identifier generation rules configured to improve extraction and analysis of contextual data (e.g., beacon data, user device data, etc.) to overcome issues with tracking and/or personalizing content delivery through a beacon network (e.g., operating in the Physical Web).

Second, the technology can confer an improvement to the functioning of computer-related technology. For example, the technology can amount to an inventive distribution of functionality across a network of one or more: beacon control systems (e.g., acting as a centralized system including a content database with sets of content identifiers associated with sets of beacons identifiers; determining identifier generation rules for generating resource identifiers enabling dynamic selection of content to be delivered based on contextual data such as beacon sensor data; etc.), beacons (e.g., generating and/or broadcasting a resource identifiers associated with content identifiers for content provided by content providers; supplying contextual data to improve personalized content delivery; etc.), user devices (e.g., acting as a communication intermediary between a beacon, a verifying entity, and a beacon control system; acting as a device where content can be presented; etc.), verifying entities (e.g., acting as a verification intermediary between broadcast of a resource identifier to a user device and presentation of content at the user device; etc.), and/or other suitable components.

Third, the technology can facilitate performance of functions not previously performable (e.g., improving upon processes). For example, the technology can apply computer-implemented rules (e.g., identifier generation rules; resource request processing rules such as data extraction rules for beacon data extraction from resource identifiers, content identifier selection rules for selecting a content identifier from a set of content identifiers for generating a response to a resource request; user preference rules; storage and retrieval rules in relation to beacon data, identifiers, and/or other suitable data; etc.) to confer improvements in beacon technology (e.g., beacons, beacon control systems, etc.) for delivering content.

Fourth, the technology can improve beacon network security, such as through applying identifier generation rules to generate resource identifiers including an HTTPS URL to be communicated across a beacon control system, beacons, user devices, verifying entities, and/or other suitable components. In another example, beacons can be associated with beacon communication protocols with enterprise-grade encryption and security algorithms, where the beacon communication protocol associated with communication of a resource identifier can be identified through the resource identifier (e.g., through a protocol identifier included in the resource identifier) for verification.

Fifth, the technology can improve digital privacy associated with delivering content with a beacon (e.g., operating with the Physical Web), such as by filtering content delivered to a user device based on permission-based user preferences for types of content, type of content identifiers, types of content presentation, and/or through other suitable means.

Sixth, the technology can transform a particular article to another state or thing. For example, the technology can transform one or more of: beacons (e.g., controlling beacons through wireless digital commands generated and transmitted by a beacon control system; controlling the beacon to disable or activate broadcasts of resource identifiers; controlling the beacon to update firmware and/or software; controlling resource identifier generation, sensor sampling, and/or other beacon processes; managing a set of beacons; controlling a beacon to operate between master and slave modes in different contexts, such as based on beacon data extracted from a resource request; etc.), a user device (e.g., activating the user device to present content, as facilitated by transmission of a corresponding resource identifier from a beacon to the user device; etc.), and/or other suitable components.

Seventh, the technology can leverage specialized computing devices (e.g., beacons including sensors, wireless communication systems configured to communicate with other beacons and/or a centralized beacon control system, and/or other suitable components) in facilitating improvements in content delivery. However, the technology can provide any other suitable benefits in the context of using non-generalized systems for delivering content.

3. Method.

Determining a resource identifier including beacon data associated with a beacon S110 functions to determine an identifier to be broadcasted by one or more beacons. A resource identifier is preferably associated with (e.g., redirects to; includes; stored in association with, such as for later retrieval and/or selection amongst a set of a content identifiers; based upon, such as through modifying the content identifier URL; etc.) one or more content identifiers identifying content provided by content providers (e.g., a single content provider; multiple content providers; etc.) and/or other suitable entity. Content identifiers are preferably stored in association with beacon identifiers (e.g., to enable retrieval of the relevant content identifier in response to extracting a beacon identifier from a resource request; etc.), but can be otherwise associated.

Resource identifiers can include any of a: uniform resource identifier (URI) (e.g., uniform resource locator, universal resource name, etc.), IP address, codes (e.g., bar code, QR code, datamatrix code, UPC code, etc.), titles, descriptions, associated media (e.g., favicons, images, video, audio, etc.), and/or any suitable resource identifying information. Resource identifiers can be used as: a website locator (e.g., for linking to a website), application locator (e.g., for launching an application), a database access resource, a file transfer resource, an email resource, a pointer to content, and/or for any suitable purpose. In variations, the resource identifier can include beacon data (e.g., beacon identifiers, sensor data, traffic data), user device data (e.g., data sampled at a sensor of a user device), random characters, and/or any suitable data. Sensor data (e.g., sampled at beacon sensors, at user device sensors, etc.) can include data from any of: motion sensors (e.g., gyroscopes, accelerometers, magnetometers, etc.), temperature sensors, optical sensors (e.g., image sensors, light sensors, etc.), location sensors, audio sensors, volatile compound sensors, humidity sensors, depth sensors, touch sensors, impedance sensors, biometric sensors (e.g., fingerprint sensors, etc.), power sensors, and/or any other suitable sensors. Resource identifiers can be static or dynamic. Additionally or alternatively, resource identifiers can be configured in any manner analogous to content identifiers and/or other suitable identifiers, and vice versa. In a first specific example, the content identifier can include a first URI associated with a content provider domain, and the resource identifier can include a second URI associated with a first party domain. In a second specific example, a resource identifier URI can be generated for media content submitted through an interface (e.g., where a content provider uploads the media content directly from their desktop). However, identifiers can be associated with any suitable domains and/or entities, and can be configured in any suitable manner.

Resource identifiers are preferably generated using one or more rules (e.g., generation rules for identifiers, for other suitable data, etc.) based on one or more of: a temporal indicator (e.g., generating resource identifiers at a time interval, during a time period, etc.), beacon data (e.g., generating a resource identifier in response to sampling a threshold size of sensor data; generating a resource identifier including a beacon identifier, sensor data, associated beacon protocol identifiers, associated identifiers such as user accounts and/or content identifiers, and/or other suitable data; etc.), user device data, identifiers (e.g., beacon identifier, application identifier, content provider identifier, beacon owner identifier, etc.), encryption parameters (e.g., for encrypting portions of the resource identifier), random generators (e.g., for appending random strings), and/or any suitable criteria.

Different rules can be applied to different beacons, content, user devices, and/or other suitable entities, which can confer improvements to the system 200 by improving content delivery (e.g., through improved personalization of content to users; through improved management of content delivery campaigns with beacons by content providers; etc.), and/or other suitable aspects. For example, a first sensor data encoding rule can be used to determine resource identifiers for a beacon including a plurality of sensor types, and a second sensor data encoding rule can be used to determine resource identifiers for a beacon including a single sensor type (e.g., where different encoding mechanisms can be applied to include and/or select sensor data while complying with a URL size requirement, etc.). The rules can be determined (e.g., obtained, retrieved, generated, executed, etc.), stored (e.g., in association with identifiers, contextual data, etc.), and/or otherwise processed by any suitable component of the system 200.

In a first variation, the method 100 can include determining a resource identifier including beacon data based on the beacon identifier (e.g., where the resource identifier includes the beacon identifier; where a identifier generation rule associated with the beacon identifier is retrieved based on the beacon identifier and utilized to determine the resource identifier; etc.). In a first specific example, the resource identifier includes a URI (e.g., web address) including: a first party host (e.g., linking to a first party server system, such as http://estimote.com) and a path including a beacon identifier (associated with a beacon on the first party server system). The path, path parameters, and/or path fragment (e.g., named anchor) can optionally include encoded beacon data, such as sensor data, location data, traffic data, or other data. In a specific example, resource identifiers can be generated in a URL form of: "https://example.info/ vvxxxyyyzzz", where vv includes a beacon communication identifier (e.g., version, type, associated operating system, etc.), xxx includes a beacon identifier, yyy includes beacon data (e.g., encoded sensor data, traffic data, etc.), and zzz includes random characters, where the number of characters associated with a data type can vary, and/or other suitable aspects of the URL can vary. In a second specific example, the beacon can be associated with a beacon communication protocol identified by a protocol identifier, and determining a resource identifier can include: determining an identifier generation rule based on a resource identifier condition (e.g., a URL restriction limiting URL size to 17 byes; requiring public URLs; requiring HTIPS URLS; etc.) defined by the beacon communication protocol; generating a resource identifier including the protocol identifier (e.g., based on an identifier generation rule) and/or other suitable beacon data, according to the resource identifier condition. However, determining resource identifiers including beacon data can be performed in any suitable manner.

In a second variation, resource identifiers can be modified to distinguish from other broadcasted resource identifiers (e.g., to facilitate downstream resource identifier processing). In a specific example, the method 100 can include storing a beacon data rule at a first beacon identified by a first beacon identifier, and applying the beacon data rule to modify the beacon identifier portion of a first resource identifier broadcasted by the first beacon, such as in response to receiving, from a second beacon, a second broadcasted resource identifier including a second beacon identifier matching the first beacon identifier. However, resource identifiers can be generated based on other resource identifiers in any suitable manner.

In a third variation, a resource identifier can be associated with a content provider domain. For example, determining a resource identifier can include appending and/or otherwise including beacon data, user data, real-time analytics, and/or other suitable data to a content identifier associated with a content provider host (e.g., where the content provider can extract the data in response to a user accessing the content associated with the resource identifier; etc.). In a specific example, the identifier generation rules can be selected based on content provider preferences for data types to be tracked. However, resource identifiers can be associated with any suitable entity in any suitable manner.

In a fourth variation, generation rules can include temporal rules controlling the timing (e.g., at noon, during night time, during periods of high user traffic, etc.), frequency (e.g., generate resource identifier and/or append characters every N seconds, etc.), and/or other temporal parameters associated with resource identifier generation.

Identifier generation rules applied by a beacon and/or beacon control system can be updated by the beacon control system, beacon, and/or other suitable component. In a first example, the method 100 can include: determining a second identifier generation rule at the beacon control system based on beacon data extracted from a resource request associated with a resource identifier generated with a first identifier generation rule; and transmitting the second identifier generation rule to a beacon, where the second identifier generation rule can be applied in any suitable processes (e.g., resource identifier generation for subsequent broadcasting and resource request processing; etc.) of the method 100. In a second example, the method 100 can include, selecting a mode of a set of modes (e.g., selecting a mode where motion sensor data is included in the resource identifier versus temperature sensor data; etc.) for applying an identifier generation rule to determine resource identifiers at the beacon, where selection of a mode can be based on any suitable data, such as data used for determining resource identifiers (e.g., selecting a state of charge data transfer mode in response to the beacon's processing system detecting a state of charge falling below a threshold; etc.). However, updating identifier generation rules can be performed in any suitable manner.

Generation rules are preferably stored at a beacon (e.g., to generate resource identifiers) and a beacon control system associated with a first party (e.g. to facilitate resolution of beacon data from a resource request comprising the resource identifier; etc.), but can additionally or alternatively be stored at any suitable component. In an example, generation rules can be transmitted to the beacon from a beacon owner device, user device (e.g., through an application in communication with a first party processing system), directly from a beacon control system (e.g., associated with a first party), and/or any component. Generating a resource identifier is preferably performed by a beacon, but can additionally or alternatively be performed by a beacon control system (e.g., where the beacon control system can transmit resource identifiers directly and/or indirectly to beacons), and/or any suitable component. In an example, a first and second identifier generation rule can be determined by the beacon control system, where the beacon control system can generate a resource identifier using the first identifier generation rule (e.g., https://example.info/[broadcast preferences]), and the beacon can update the resource identifier using the second identifier generation rule (e.g., https://example.info/[broadcast preferences][beacon ID][sensor data]), where the data types in parenthesis are filled during the resource identifier generation and/or update. However, storage and application of generation rules can be performed by any suitable entity.

Determining a resource identifier can be performed at predetermined time intervals (e.g., according to a temporal-based generation rule; every second; every minute; every hour; etc.), in temporal relation (e.g., in parallel, serially, substantially concurrently, etc.) to a generation condition (e.g., dynamically determining resource identifiers based on collected beacon data, such as determining a new resource identifier in response to motion data detecting movement of the beacon and/or surrounding entities; determining a resource identifier in response to receiving a content identifier and/or content; determining a new resource identifier in response to a receiving resource request associated with a broadcasted resource identifier; in response to analytics data satisfying a condition, such as an impression or clickthrough associated with a broadcasted resource identifier; etc.) and/or other suitable conditions, and/or at any suitable time and frequency. In an example, different broadcasting beacons can generate resource identifiers corresponding to the same content. In a specific example, the method 100 can include, extracting beacon data for a first beacon from a resource request for a first resource identifier (e.g., https://example1.info/[beacon id1][sensor data1]) associated with a first content identifier; in response to the beacon data satisfying a threshold condition (e.g., a state of charge below a threshold; user movement, such as in a particular direction towards a section of a merchant store; temperature above a threshold; etc.), determining a second resource identifier (e.g., https://example1.info/[beacon id2][sensor data2]) for broadcast by a second beacon based on the first content identifier (e.g., where the second beacon broadcasts a resource identifier leading to presentation of first content identified by the first content identifier) and a second beacon identifier (e.g., where the second beacon identifier is associated with the first beacon identifier; where the second beacon is at a distance below a threshold distance from the first beacon; where the first and second beacons are owned by the same beacon owner; where the beacon profiles for the first and the second beacons share historic delivery of content similar to the content identified by the first content identifier; etc.). In this specific example or other examples, the method 100 can optionally include: associating the second beacon identifier with a second content identifier identifying second content (e.g., related to the first content; independent from the first content; default content associated with the second beacon; etc.); determining a supplementary resource identifier based on the second content identifier and the second beacon identifier; and broadcasting the second resource identifier and the supplementary resource identifier (e.g., in alternation; concurrently; serially; at scheduled time periods; based on beacon data; etc.) at the second beacon. However, determining resource identifiers can be performed in any suitable manner.

Figure 2:
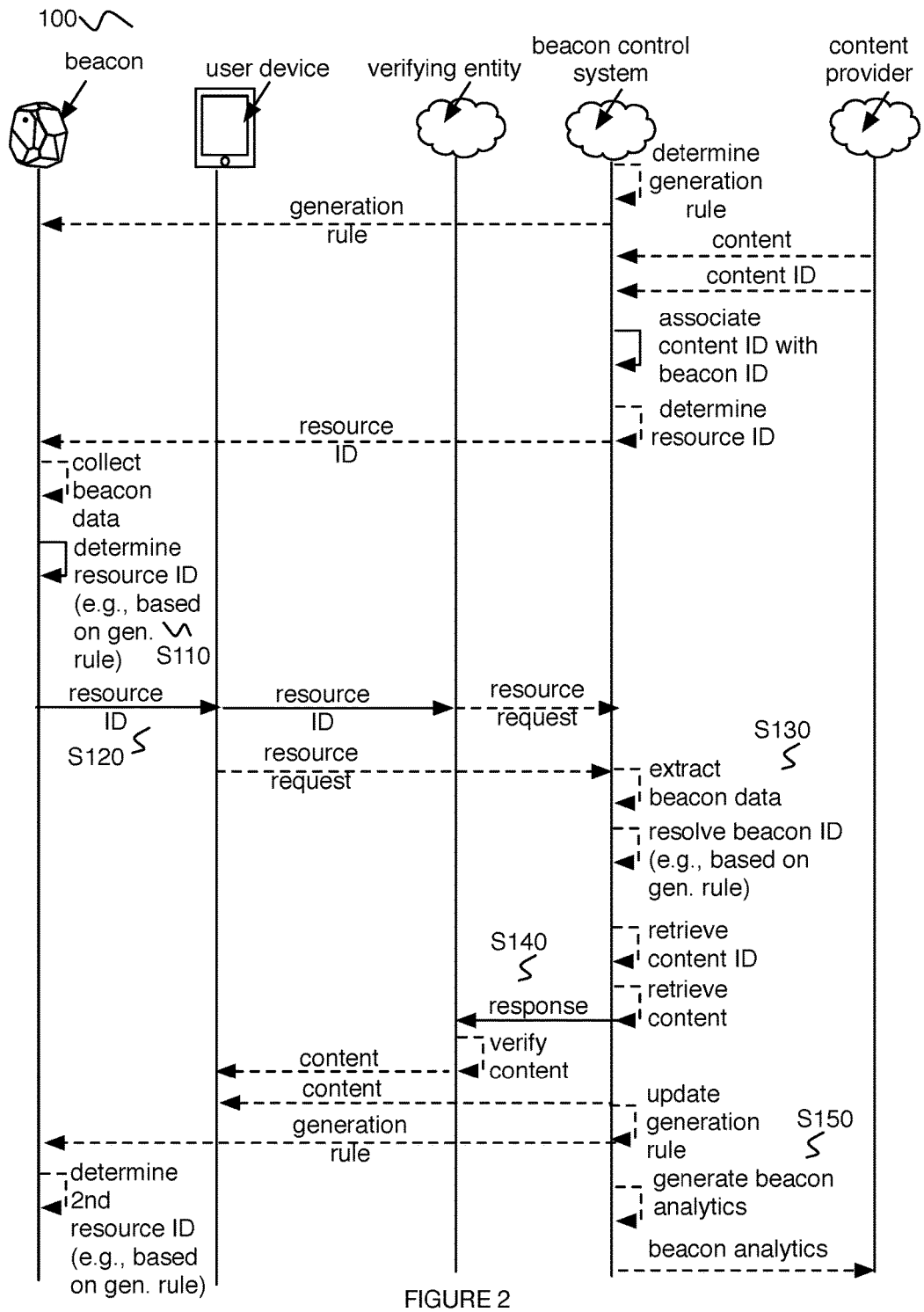
FIG. 2 is a schematic representation of a variation of the method.
Figure 3:
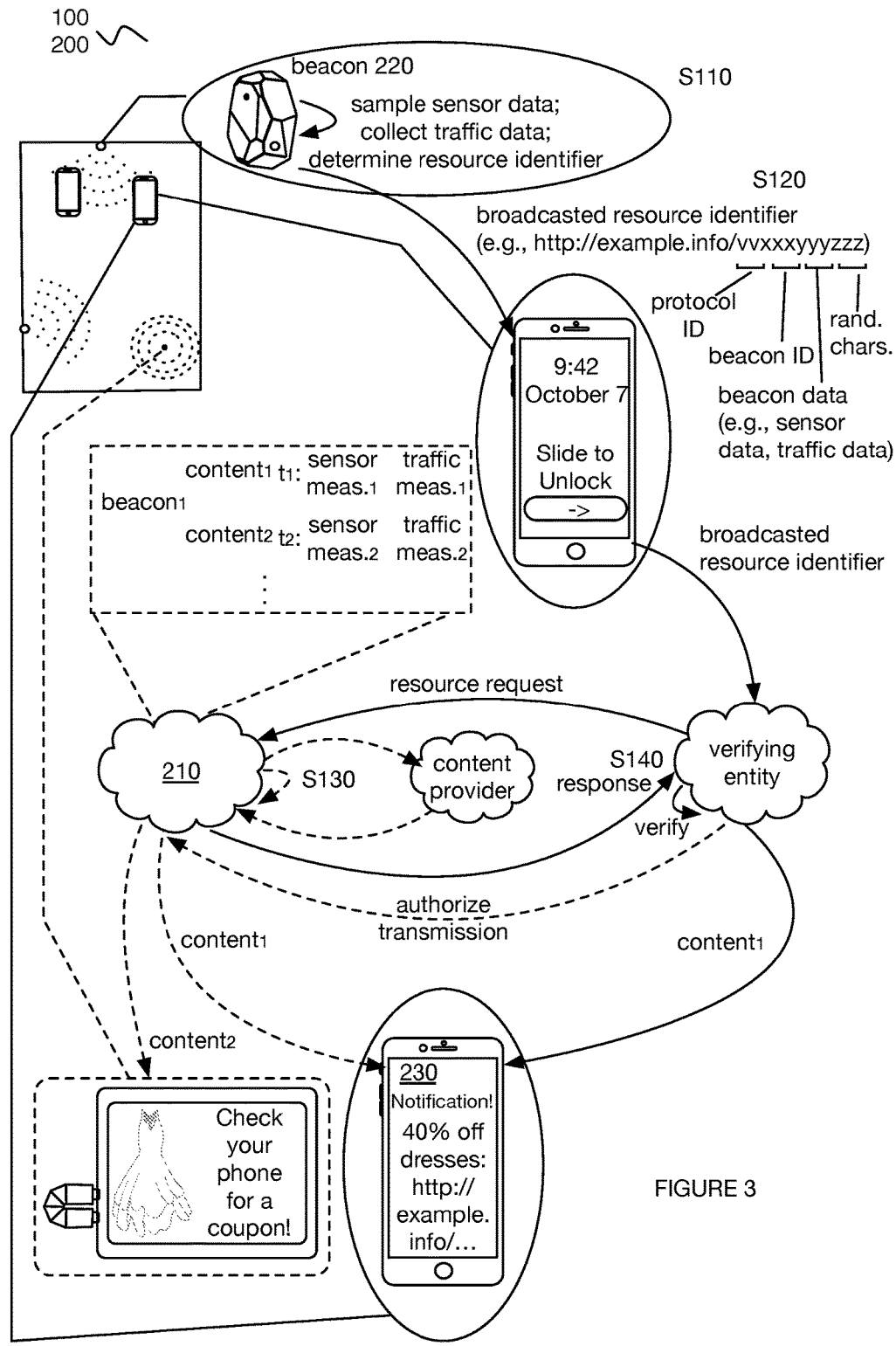
FIG. 3 is a schematic representation of a variation of the method.

As shown in FIGS. 1-3, broadcasting a resource identifier with one or more beacons S120 can function to disseminate one or more resource identifiers associated with content to be verified (e.g., by a verifying entity), and/or presented to a user at a user device. For example, broadcasting can including broadcasting a resource identifier from a beacon to a user device associated with a user proximal the beacon, where the user device is configured to transmit the resource identifier to a verifying entity. Additionally or alternatively, the method 100 can include broadcasting content directly (e.g., without the intermediary of a resource identifier), and/or any other suitable data.

Broadcasted resource identifiers are preferably transmitted to a user device (e.g., a user device within a threshold distance to the beacon; a user device that subsequently transmits a broadcasted resource identifier to a verifying entity, etc.), but can be directly transmitted to a verifying entity (e.g., a verifying entity device), a beacon control system (e.g., a remote computing system, etc.) associated with a first party and/or third party, and/or to any suitable component. Broadcasting is preferably wireless (e.g., through Bluetooth Low Energy, Bluetooth Long Range, etc.), but can be through any suitable communication means. Broadcasting resource identifiers is preferably continuously performed during operation of a beacon, but can additionally or alternatively be performed in response to satisfaction of broadcasting conditions. Broadcasting conditions can include any one or more of: user device data (e.g., detection of a user device that has opted in to receive broadcasted resource identifiers, detection of a particular user device type, user device location in relation to beacons, etc.), temporal conditions (e.g., broadcasting resource identifiers during specific time periods, at time intervals, etc.), beacon conditions (e.g., based on beacon sensor data, traffic data, state of charge, etc.) and/or any suitable conditions.

Any number of resource identifiers can be broadcasted by any number of beacons (e.g., different resource identifiers generated based on different beacon communication protocols, etc.). In a variation, the method 100 can include coordinating the broadcasting of one or more resource identifiers amongst a set of beacons. In an example, coordinating can include communicating a priority resource identifier between beacons for each beacon to broadcast. In another example, coordinating can include disabling broadcasting for a beacon (e.g., to restrict the number and/or type of resource identifiers broadcasted in an area). In a specific example, the method 100 can include disabling a beacon (e.g., through a command transmitted by a beacon control system; through a rule stored at the beacon; etc.) from broadcasting a resource identifier in response to beacon data (e.g., extracted from a resource request; sampled at a beacon sensor) satisfying a threshold condition (e.g., a state of charge below a threshold). In examples, disabling or activating broadcasting can be based on other sensor data, time of day, scheduling of communications (e.g., scheduling communications based on beacon data collected from resource identifiers; scheduling broadcasting in temporal relation with dissemination of firmware updates across the network of beacons; etc.), and/or other suitable data. However, broadcasting resource identifiers can be performed in any suitable manner.

As shown in FIG. 1-3, the method 100 can optionally include receiving the resource identifier at a processing system (e.g., remote system) associated with a verifying entity, which can function to facilitate verification of content associated with received resource identifiers. The received resource identifier is preferably a broadcasted resource identifier (e.g., originating at one or more beacons), but can additionally or alternatively be any suitable resource identifier (e.g., a resource identifier transmitted from a first party beacon control system; a different form of the resource identifier; etc.). In variations, the method 100 can include one or more of: transmitting a resource identifier from a beacon to a receiving device (e.g., user device, another beacon, first party processing system, etc.); transmitting the resource identifier to a client on the receiving device (e.g., an executing application); and/or transmitting the resource identifier to a processing system associated with a verifying entity. In one example, the resource identifier broadcast by the beacon is received by a client (e.g., browser application, operating system application, third party application, etc.) running on a user device, where the client forwards the resource identifier to the verifying entity.

The method 100 can additionally or alternatively include transmitting a resource request (e.g., an HTTP request from a verifying entity) to access content associated with the resource identifier. Resource requests are preferably transmitted to a first party processing system (e.g., a beacon control system at which content is stored), but can optionally be transmitted to processing systems associated with third parties and/or any entity. In a variation, transmitting a resource request can be based on comparisons with historic resource identifiers. For example, the method 100 can include receiving a resource identifier; comparing the resource identifier with historic resource identifiers (e.g., received from one or more user devices); transmitting a resource request in response to the resource identifier failing to match a historic resource identifier; and returning stored content in response to the resource identifier matching a historic resource identifier. Additionally or alternatively, transmitting resource requests can be based on temporal parameters, user device data (e.g., location, operating system, device type, etc.), and/or other suitable parameters. However, receiving the resource identifier at a processing system associated with a verifying entity can be performed in any suitable manner.

As shown in FIGS. 1-3 and 4, processing a resource request S130 can function to receive a resource request; resolve a beacon identifier (e.g., based on extracted beacon data); extract beacon data from the resource request; select a content identifier; and/or perform other suitable processes for facilitating content delivery. A resource request preferably includes and/or is associated with one or more resource identifiers (e.g., where the resource request includes passing the resource identifier through a proxy; where the resource request includes data extracted from the resource identifier; etc.), but can additionally or alternatively include: user device information (e.g., user device type, IP address, location, operating system, applications, etc.) for a user device associated with the resource request, user data (e.g., profile information; user account information; preferences, demographic, location history, purchase history, shopping patterns, temporal patterns, etc.), and/or any suitable information.

Processing the resource request can be based on: resource identifier generation rules (e.g., used by a beacon control system to resolve beacon data from a resource identifier generated by the rule; etc.), beacon data (e.g., historic beacon data, beacon data across a set of beacons, beacon data extracted from the resource request and/or other requests, such as for selecting a relevant content identifier, etc.), user data (e.g., user profiles stored by the beacon control system and identified based on user device data extracted from the resource request; user account information associated with user devices receiving resource requests; etc.), user device data (e.g., included in the resource request; etc.), and/or any other suitable data. For example, processing can include textually parsing the characters of the resource identifier (e.g., to extract a beacon identifier) based on textual patterns defined by a generation rule (e.g., stored at a beacon and a first party beacon control system). However, processing the resource request can be based on any suitable techniques including natural language processing, machine learning, decryption (e.g., with a private key paired to a public key stored at the beacon associated with the resource request), and/or other suitable approaches.

Processing a resource request preferably includes receiving the resource request. Subsequent processing operations are preferably performed in response to receiving the resource request, such as in real-time, but can additionally or alternatively be batched, processed at a predetermined frequency (e.g., processing a resource request every N seconds), in response to satisfaction of conditions (e.g., receiving confirmation from a content provider, confirming legitimacy of associated content, etc.), and/or at any suitable time. In a variation, processing a set of resource requests (e.g., associated with multiple user devices, associated with a single user device, etc.) can include generating a resource request ranking (e.g., prioritizing resource requests to process, to deny; temporally sequencing processing operations to perform on resource requests; etc.), which can be based on any one or more of: resource request time (e.g., broadcasting time of the associated resource identifier, receipt time at the processing system associated with the entity processing the resource request, etc.), beacon owner identifier (e.g., associated with beacon owner preferences for content delivery), verifying entity identifier (e.g., prioritizing resource requests from a first verifying entity over a second verifying entity), content provider identifier (e.g., prioritizing a resource request associated with content from a beacon campaign with the highest bid) user device information (e.g., prioritizing resource requests for content scheduled to be immediately delivered based on user device information; prioritizing based on user device location proximity to the beacons associated with the resource requests; etc.), and/or any suitable criteria. However, receiving and/or ranking resource requests can be performed in any suitable manner.

Processing a resource request can include resolving a beacon identifier, which can facilitate retrieval of content (e.g., stored in association with the beacon identifier), association of beacon data (e.g., with the beacon identifier), and/or generation of beacon-specific beacon analytics (e.g., based on data associated with the beacon identifier). The resolved beacon identifier is preferably for the beacon that broadcasted the resource identifier associated with the resource request, but a resource request can include any number of beacon identifiers identifying any suitable beacon. In examples, resolving a beacon identifier can include resolving a non-unique beacon identifier (e.g., a beacon identifier associated with and/or broadcasted by multiple beacons; a beacon identifier selected by a beacon owner; a shortened beacon identifier included in a resource identifier compliant with URL restrictions; etc.). Resolving a beacon identifier (e.g., mapping the shared beacon identifier to a manufacturer beacon identifier for the beacon associated with the resource request) is preferably based on one or more identifier generation rules (e.g., used to generate the resource identifier from which the beacon identifier is resolved; etc.) but can additionally or alternatively be based on any one or more of: beacon data (e.g., sensor data, traffic data, etc.), user device information (e.g., location, user device type, associated user account, etc.), beacon communication protocol, and/or any other suitable information.

In a first example, the method 100 can include: transforming a manufacturer beacon identifier into a shortened beacon identifier based on an identifier generation rule; including the shortened beacon identifier in the resource identifier; receiving a resource request including the resource identifier; extracting the shortened beacon identifier from the resource request; transforming the shortened beacon identifier back into the manufacturer beacon identifier based on the operations used by the identifier generation rule. In examples, resolving a beacon identifier based on identifier generation rules can include extracting contextual data (e.g., beacon data, user device data) from the resource request based on the identifier generation rules (e.g., used to include the contextual data in the resource identifier); and resolving the beacon identifier based on the contextual data (and/or the non-unique beacon identifier included in the resource identifier). In a second example, resolving a beacon identifier can include comparing extracted beacon data (e.g., from the resource request) to historical beacon data corresponding to the manufacturer beacon identifiers associated with the beacon identifier; and resolving the beacon identifier into the manufacturer beacon identifier corresponding to the historical beacon data with greatest similarity (e.g., in relation to data patterns such as sensor data patterns, values, etc.) to the extracted beacon data. In a specific example, the extracted beacon data can include the beacon location, where the beacon can include a location system (e.g., GPS system). In a third example, resolving a beacon identifier can include determining a location of a user device (e.g., based on location data sampled at the user device and included in the resource request, based on IP address, etc.) associated with the resource request; and resolving the beacon identifier into the manufacturer beacon identifier identifying a beacon (e.g., identified by the beacon identifier) in closest locational proximity to the location of the user device. In a fourth example, resolving a beacon identifier can include resolving a user device identifier (e.g., by receipt in the resource request, by analyzing the resource request, etc.); retrieving a user pattern (e.g., interactions with beacons, location, motion, shopping, user device information, etc.) associated with the user device identifier; and filtering manufacturing beacon identifiers based on the user pattern. However, resolving a beacon identifier can be otherwise performed.

Processing a resource request can include extracting beacon data (e.g., from a resource identifier in the resource request). Extracted beacon data is preferably associated with the beacon broadcasting the resource identifier associated with the resource request, but can additionally or alternatively be associated with one or more secondary beacons (e.g., where the broadcasting beacon received the secondary beacons' data prior to broadcasting the resource identifier; etc.) and/or can be associated with any other suitable data. In an example, a resource request associated with a beacon can include beacon data for multiple beacons (e.g., a first beacon transmitting first beacon sensor data to a second beacon that is broadcasting resource identifiers, where the second beacon can generate resource identifiers including sensor data from the first and the second beacons; where the second beacon can broadcast resource identifiers in alternation to alternate between broadcasting first resource identifiers with first beacon sensor data and second resource identifiers with second beacon sensor data; distributing beacon data cross a plurality of beacons for broadcasting to improve beacon network efficiency; etc.). In other examples, extracting the beacon data can include: decoding, associating with a temporal indicator, storing in association with a beacon identifier, and/or any other suitable processing techniques. However, extracting beacon data and/or otherwise processing resource requests can be performed in any suitable manner.

Processing a resource request can include selecting a content identifier (e.g., where the content identifier can be included in a response to the verifying entity; where the content identifier can be used to retrieve and deliver content to the user device and/or verifying entity; etc.). A content identifier can be selected from a set of content identifiers. For example, the resource identifier included in the resource request can be associated with a plurality of potential content identifiers that can be selected from for delivering different content (e.g., selecting content identifiers to optimize for analytics metrics, for personalization, etc.). The set of content identifiers can be initially received (e.g., at the beacon control system) from one or more content providers, for one or more beacons, for one or more resource identifiers, and/or from any suitable entities. Any number of content identifiers can be selected for any number of beacons and/or resource identifiers. In a first specific example, the method 100 can include receiving a second resource request (e.g., where the first resource request was associated with a first resource identifier corresponding to a first beacon) associated with a second beacon (e.g., identified by a second beacon identifier associated with a set of content identifiers that is additionally associated with a first beacon identifier identifying the first beacon); extracting the second beacon data based on the second resource request; and selecting a second content identifier from the set of content identifiers based on the second beacon data (e.g., where a first content identifier was selected from the set of content identifiers for the first resource request). In a second specific example, multiple content identifiers can be selected from a set of content identifiers (e.g., where a first content identifier, selected based on extracted beacon data, can be used in a response to the resource request, and a second content identifier identifying complementary content can be selected for transmission to a beacon for presentation of the complementary content, such as through broadcast by the beacon or through presentation at a television display at a merchant store, as shown in FIG. 3; etc.). Alternatively, a beacon identifier and/or resource identifier can be associated with a single content identifier, where selecting a content identifier can include mapping the beacon identifier (e.g., resolved from the resource request), resource identifier, and/or other suitable data to the content identifier.

In a first variation, selecting a content identifier can be based on beacon sensor data. In a first example, the method 100 can include: sampling first sensor data at a first sensor of a first beacon; determining a first resource identifier based on the first sensor data; extracting the first sensor data from a resource request associated with the first resource identifier; and selecting a first content identifier from the set of content identifiers based on the first sensor data (e.g., selecting a warm-weather clothing advertisement over a cold-weather clothing advertisement in response to temperature sensor data over a threshold; selecting content with brighter colors in response to ambient light data indicating darkness; selecting content applicable to a wide demographic of users in response to detecting beacon motion based on motion sensor data; etc.).

In a second example, sensor data from a set of beacons (e.g., beacons proximal each other) can be used in selecting a content identifier (e.g., for a resource request corresponding to a single beacon included or excluded from the set of beacons; etc.). In a specific example, content identifier selection corresponding to a first beacon can be based on motion data from a proximal second beacon being moved towards the first beacon (e.g., where the second beacon is attached to a product, and selected content can include an advertisement for a complementary product; etc.). In another specific example, sensor data of a given type collected across a plurality of beacons can be combined (e.g., average, median, etc.) and used in content identifier selection. In another specific example, approaches (e.g., machine learning approaches) leveraging correlations between historic sensor data and high-performing (e.g., in relation to analytics metrics) content can be used to guide content identifier selection. In an illustration, the method 100 can include determining a set of analytics metrics for the set of content identifiers (e.g., number of clickthroughs for each of the content served, etc.), the set of analytics metrics associated with presentation of the set of content during a time period; determining correlations between the set of analytics metrics and a set of beacon data associated with the time period (e.g., beacon data values when a user accessed a piece of content); and selecting the content identifier from the set of content identifiers based on the correlations and current beacon data.

In a third example, selecting a content identifier can be based on location data (e.g., indicating location of a user device in relation to one or more beacons; indicating locations of beacons; etc.). Determining location can be based on signal data (e.g., signal quality; received signal strength indicators; Wi-Fi positioning system parameters; signal angle of arrival with directional sensors associated with the beacons and/or user devices; signal time of arrival; etc.), visual markers (e.g., determining location of a beacon visual marker, determining location of visual markers positioned around a merchant store, determining a location relative visual markers positioned in a room and captured by an optical sensor of the user device; etc.), optical data (e.g., camera data, light sensor data, etc.); audio data, temperature data; inertial measurements (e.g., footsteps tracked by motion sensors of the user devices), magnetic positioning, and/or other suitable location-associated data (e.g., sampled by the beacons, user devices, etc.). In a specific example, determining user device location (e.g., in relation to a beacon) can be based on beacon data from a set of beacons (e.g., motion data, signal data from communications between beacons and/or user devices; etc.). In another specific example, determining user device location in relation to a beacon can include triangulation with a set of beacons, such as through processing resource requests corresponding to resource identifier broadcasts from the set of beacons during a time period (e.g., within a threshold period of time with each other), extracting beacon data from the resource requests, and performing triangulation based on the beacon data. In another specific example, for a beacon associated with a museum exhibit in a museum, a museum map can be selected in response to a user device distance above a distance threshold from the beacon, and specific contextual information about the exhibit can be selected in response to the user device distance below the distance threshold. However, selecting identifiers based on sensor data can be performed in any suitable manner.

In a second variation, selecting a content identifier can be based on user device data (e.g., selecting content with formatting compatibility with the user device specifications; selecting advertisements prompting download of mobile applications that are executable on the user device operating system; etc.). In a first example, processing a resource request can include extracting user device data (e.g., user device sensor data); and selecting the content identifier based on the user device data (and/or beacon data) (e.g., processing location sensor data of the user device with sensor data of the beacon to determine location of the user device in relation to the beacon; etc.). In a second example, user device data can include and/or be mapped to user data (e.g., user profiles including purchase history, consumer preferences, etc.) for personalizing content selected for delivery. In a third example, user device data and/or other suitable data can be leveraged in determining a location of a number of users (e.g., proximal one or more beacons, within a geofence, etc.), which can be used in content identifier selection. However, selecting identifiers based on user device data can be performed in any suitable manner.

In a third variation, selecting a content identifier can be based on content provider preferences (e.g., monetary bids, delivery preferences such as geofences associated with delivery for different content, sensor data conditions for delivery such as proximity of user device to beacon to initiate delivery of a piece of content, etc.). For example, a set of content identifiers can be associated with a set of content providers, where the method 100 can include receiving a set of preferences from the set of content providers; and selecting the set of content identifiers based on the set of preferences (and/or other suitable data such as beacon data) (e.g., using temperature sensor data to rank content identifiers for different types of food based on preferences for content delivery at specified ambient temperature ranges; ranking content identifiers based on associated monetary bids and correlations between content performance and beacon sensor data; etc.). However, selecting content identifiers based on content provider preferences can be otherwise performed.

In a fourth variation, selecting a content identifier can be based on historic selections of content identifiers. In examples, selected content identifiers can rotate, alternate, and/or be selected in any suitable pattern. In a specific example, selecting a second content identifier (e.g., corresponding to a second beacon associated with a set of content) can be in response to previously selecting a first content identifier (e.g., corresponding to a first beacon associated with the set of content) for a response to a preceding resource request. However, selecting content identifiers based on any suitable data can be performed in any suitable manner.

Processing a resource request is preferably performed by a processing system (e.g., remote system) associated with the first party, but can additionally or alternatively be performed by processing systems associated with content providers and/or other suitable entities. The resource request is preferably from a verifying entity (e.g., where content transmitted to the requesting verifying entity can be used by the verifying entity to verify the content), but can be from a content provider (e.g., to preview the content associated with the content provider), a user device, and/or any suitable entity. Processing a resource request can be performed at predetermined time intervals, in temporal relation to a condition (e.g., in response to receiving a resource request; based on resource request ranking; in response to receiving resource requests including certain types of data; etc.), and/or at any suitable time and frequency. However, processing resource requests can be performed in any suitable manner.

As shown in FIG. 3, transmitting a response to a resource request S140 can function to facilitate delivery of requested content (e.g., to a verifying entity; directly to a user device; etc.) for presentation to one or more user devices. The response preferably includes a content identifier, but can additionally or alternatively include the content itself (e.g., retrieved based on the content identifier), beacon data, and/or any other suitable data (e.g., data extracted from the content identifier). Transmitted content is preferably identified by one or more content identifiers (e.g., selected during processing of a resource request, such that transmitting a response is based on extracted beacon data and content identifiers selected based on the extracted beacon data), but can be otherwise identified. The content identifier is preferably associated with the beacon identifier and/or the resource identifier corresponding to the resource request, but can be otherwise associated. The content identifier-to-beacon identifier association can be determined by the beacon owner, content provider, or any other suitable entity, such as at a web interface. The association can be stored and managed by the first party, the beacon owner, and/or by any other suitable entity. The content identifier can be the resource identifier, a pointer or filepath for content stored by the system receiving the resource request, an identifier different from the resource identifier (e.g., a URI, URL, and/or other identifier pointing to an external database, such as http://coke.ad.com/yyy), and/or be any other suitable identifier. The content identifier is preferably static, but can be dynamic. Content and/or other suitable data can be in any suitable format including: text, verbal, visual, audio, haptic, etc. Content can include any of: content title, description, associated media (e.g., favicons, graphics, video, audio, etc.), content associated with the content identifier URI, identifier resource identifiers (e.g., a resource identifier redirected to by a broadcasted resource identifier, etc.) and/or other suitable content. Content can be transmitted in any form including: notifications (e.g., text message, push notification, e-mail, in-application notification, etc.), resource identifiers (e.g., linking to the content), and/or any suitable form.

Transmitting a response is preferably performed by a first party processing system, but can optionally be by a processing system associated with a content provider, verifying entity, and/or other suitable entity. Transmitting a response can be directly to one or more user devices (e.g., using user device identifier received with the resource request), to a verifying entity processing system that can verify and/or otherwise process the content prior to transmission to the user device, to any suitable component prior to the user device, and/or to any suitable endpoint. In a variation, transmitting a response can include retrieving the content associated with the content provider (e.g., based on the content identifier), and transmitting the retrieved content to a suitable endpoint (e.g., user device). The content can be retrieved from first party storage (e.g., a content database storing content in association with one or more beacon identifiers), from a processing system associated with the content provider (e.g., based on a resource identifier from a content provider), and/or otherwise obtained. The content can be retrieved at a predetermined frequency, in response to a resource request, in response to initiation of a beacon campaign, and/or at any suitable time. In an example, storing content for subsequent retrieval can be in response to verifying that a content provider identifier for the content provider is associated with a suitable permissions level (e.g., permitting the content provider to serve content in relation to beacons and/or locations selected by the content provider), but any suitable entity can modify and/or be associated with any suitable permissions level (e.g., denying content delivery, permitting delivery of specific types of content based on content type, permitting content delivery based on beacon identifiers, location, bids, user preferences, etc.).

In a first variation, transmitting a response can include transmitting personalized content to a user device based on a user profile (e.g., generated from user device data, user data, etc.) for the user associated with the user device. In a second variation, transmitting a response can include transmitting content from multiple content providers to a user device (e.g., for serial presentation based on scheduling parameters, for parallel presentation, for presentation within a single application executing on the user device, for presentation within multiple applications, etc.). Scheduling parameters can be based on bids by content providers, user preferences, user device data, user data, etc. In a third variation, transmitting a response can be performed according to presentation parameters (e.g., temporal parameters for when to present content, form of content, etc.).

Transmitted responses can include any number of content identifiers and/or amount of content associated with any number of entities. In a variation, the method 100 can include transmitting a response for each resource request and/or resource identifier received in association with the user device (e.g., transmitting first content for a first resource request, and transmitting second content for a second resource request). In another variation, the method 100 can include transmitting a single instance of content in response to receiving multiple resource requests and/or resource identifiers for the same content within a predetermined time period for a single user device. In another variation, the method too can include transmitting a response based on a ranking of a set of resource identifiers and/or a set of content providers. Ranking can be based on bidding, user device location (e.g., in relation to beacons), user preferences, beacon owner preferences, and/or other suitable criteria. For example, the method 100 can include associating a resource identifier with a first and a second content from a first and a second content provider, respectively; receiving a resource request including the resource identifier; and prioritizing transmission of the first content (e.g., sending the first content before the second content; sending only the first content, etc.) based on the first content provider setting a higher bid over the second content provider. However, transmitting a response can be performed in any suitable manner.

Figure 4:
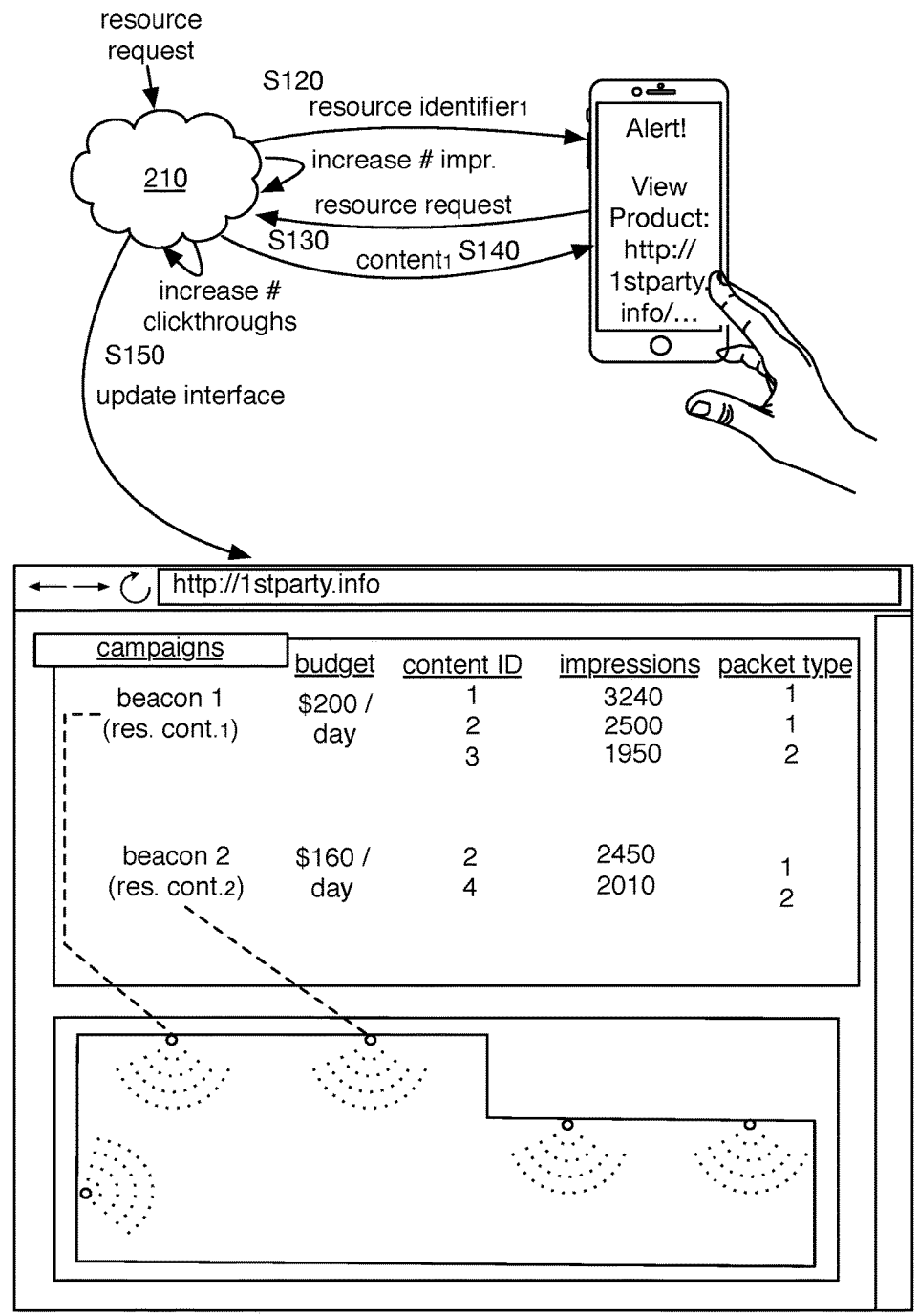
FIG. 4 is a schematic representation of a variation of generating beacon analytics.
Figure 5:
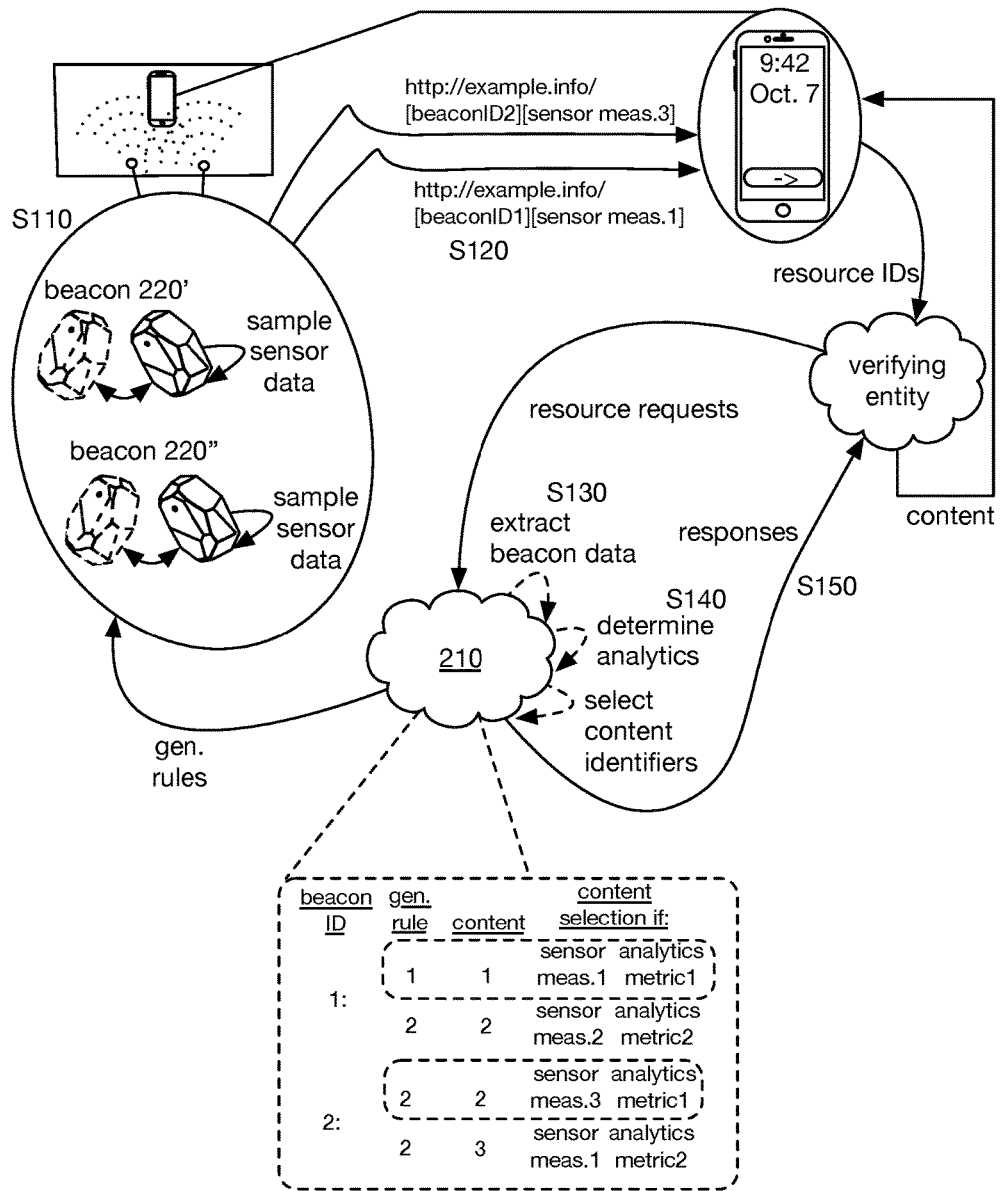
FIG. 5 is a schematic representation of a variation of the method.

As shown in FIG. 4, the method 100 can optionally include generating beacon analytics S150, which functions to track user interaction with content and/or beacons, in order to generate analytics for presentation to a suitable entity (e.g., content provider, beacon owner, etc.). Beacon analytics can include any suitable analytics metric types relating to one or more of: impressions (e.g., of content), clickthroughs (e.g., of resource identifiers included in content), conversions (e.g., associated with the content; account signups; product purchases, etc.), geolocation, traffic data (e.g., for a given location, for a given user population, etc.), an estimated number of user devices in an area (e.g., within a threshold distance of a beacon, within an area defined by a set of beacons, etc.), device types, or any other suitable metric. Generating beacon analytics is preferably performed at a processing system associated with a first party, but can additionally or alternatively be performed at a beacon, at a content provider processing system, and/or at any suitable component.

In a first variation, tracking number of impressions for a content (e.g., an advertisement) associated with a content provider can be based on number of resource requests for the content, number of transmissions of the content, and/or other suitable criteria. In a second variation, tracking number of clickthroughs for a resource identifier can include transmitting a resource identifier for a first party domain (e.g., for serving content, for redirecting to a content provider domain, etc.); and tracking visits to the domain from the resource identifier. In a third variation, generating beacon analytics can include generating traffic data, which can include any one or more of: user device data (e.g., number of user devices within a threshold distance from a beacon over a time period, geolocation of the user device, types of user devices, etc.), user data (e.g., number of times a user has entered a particular area, etc.) and/or other suitable traffic information. For example, the method 100 can include collecting, at one or more beacons, beacon data based on wireless signals (e.g., Bluetooth Low Energy) received from proximal user devices; and generating traffic data based on the beacon data. In a fourth variation, generating beacon analytics can be based on correlations between metric types and sensor data. For example, beacon analytics can correlate traffic data patterns (e.g., an increased amount of traffic in a retail store) with temperature data (e.g., lower temperatures from using air conditioning) sampled at a beacon located within the retail store.

In a fifth variation, generating beacon analytics can be for any combination of beacons (e.g., a beacon fleet) and/or locations. For example, beacon analytics can include an average number of content impressions per beacon in a first location versus a second location.

In a sixth variation, as shown in FIG. 4, generating beacon analytics can include generating cross-packet type analytics (e.g., comparing metrics for Physical Web broadcasts versus non-Physical Web broadcasts). For example, the method 100 can include: determining a first analytics metric for content based on a first set of beacon broadcasts (e.g., at a first beacon) associated with a first packet type (e.g., including a resource identifier associated with the content); determining a second analytics metric for the content based on a second set of beacon broadcasts (e.g., at a first beacon, at a different beacon, etc.) associated with the second packet type (e.g., associated with a different resource identifier type; independent from resource identifiers; etc.); and determining a cross-packet type metric for the content based on a comparison between the first and second analytics metrics. However, determining beacon analytics can be performed in any suitable manner.

4. System.

As shown in FIG. 3, embodiments of the system 200 include a beacon control system 210 and one or more beacons 220 (e.g., first beacon 220', second beacon 220", etc.), but can additionally or alternatively include an interface 230, a verification system, a content provider system, and/or any other suitable components. Components of the system 200 can be configured in any manner analogous to U.S. application Ser. No. 15/590,939 filed 9 May 2017 and/or U.S. application Ser. No. 15/620,014 filed 12 Jun. 2017, each of which are incorporated in its entirety by this reference. The beacon control system 210 functions to determine identifier generation rules, process resource requests, transmit responses to resource requests, and/or perform any suitable portion of the method 100 (e.g., generate resource identifiers). The beacon control system 210 can include a content database (e.g., storing identifiers, rules, beacon data, user device data, and/or other suitable data in optimized associations with each other to improve data storage and retrieval for facilitating content delivery, etc.), computing systems (e.g., a remote computing system), and/or any other suitable components. However, the beacon control system 210 can be configured in any suitable manner. Beacons 220 function to generate and broadcast resource identifiers, and/or perform other suitable portions of the method 100. Beacons 220 can include: a wireless communication system (e.g., for receiving content identifiers, for broadcasting resource identifiers, for receiving rules, etc.), a processing system (e.g., for applying rules to generate resource identifiers, etc.), sensors, power sources, data connectors, housings, and/or any other suitable components. However, beacons 220 can be configured in any suitable manner.

The system 200 can additionally or alternatively include an interface 230 (e.g., web interface, application, etc.), which can function to enable management of beacon campaigns, presentation resource analytics, receipt and/or presentation content, and/or other suitable processes for facilitating interactions between beacon systems, beacons 220, beacon owners, content providers, users, and/or other suitable entities. In a variation, as shown in FIG. 4, an interface 230 can include a geographical map including available location options and/or beacon options (e.g., mapped to location identifiers and/or beacon identifiers, respectively). The options can be selectable by a beacon owner (e.g., to view analytics and/or beacon campaigns associated with the selected location and/or beacon), a content provider (e.g., to identify locations and/or beacons 220 to bid upon for content delivery), a user (e.g., to view content associated with the location and/or beacon), and/or other entity.

In another variation, the interface 230 can include a beacon owner interface. The beacon owner interface preferably enables a beacon owner and/or authorized entities to set one or more preferences for: content delivery (e.g., preferred content format, prioritizing communications from selected content providers, permissions for content, enabling content delivery based on user location, demographic, device, etc.), beacons 220 (e.g., selecting a custom beacon identifier for broadcasting by the beacon, authorizing content providers to deliver content through selected beacons 220, resource identifier generation rules, etc.), beacon campaign (e.g., bidding rules, etc.), beacon analytics (e.g., metric types to track or transmit, sensor data types to collect or transmit, analytics-related notifications, etc.), content templates, and/or any suitable preferences. In an example, the system 200 can be configured to receive, at a beacon owner interface, a content provider identifier for a content provider; associate the content provider identifier with a beacon identifier for a beacon owned by the beacon owner; and in response to associating the content provider identifier, provide a content provider interface that includes options for the content provider to transmit content to be delivered in association with the beacon. However, a beacon owner interface can be otherwise configured.

In another variation, the interface 230 can include a content provider interface. The content provider interface preferably enables content providers to manage beacon campaigns, including managing one or more of: associations of content identifiers with beacons 220 (e.g., where the interface 230 can be configured to receive a content identifier at a prompt associated with a beacon), preferences for selection of content identifiers from a set of content identifiers associated with a beacon 220, target user parameters (e.g., based on demographic, location, device, time, beacon sensor data, traffic data, etc.), content delivery parameters (e.g., campaign start time, campaign end triggers such as time money, ending a campaign based on number of impressions, conversions, clickthroughs, other beacon analytics, etc.), content (e.g., modifying the content to be delivered, personalizing the content based on user location in relation to a beacon 220, beacon sensor data, etc.) and/or any suitable parameters. Any number of beacon identifiers can be associated with any amount or types of content received from any number of content providers. However, a content provider interface can be otherwise configured.

In another variation, the interface 230 can include a user interface (e.g., provided through an application on the user device, provided as a web interface, etc.). The user interface can facilitate one or more of: filtering content (e.g., based on topic, distance, brand, type, etc.), browsing content, content receipt preferences (e.g., receiving content in the form of text messages, privacy settings, purchase history sharing, etc.), and/or any other suitable activity. The user interface can present content in any suitable format (e.g., notification in a widget, notification through an application, text message, etc.). However, a user interface, and/or other suitable interfaces 230 can be configured in any suitable manner.

The system 200 and/or components of the system can entirely or partially be executed by, hosted on, communicate with, and/or otherwise include: a remote computing system (e.g., a server, at least one networked computing system, stateless, stateful), a local computing system, user devices, databases, and/or by any suitable component. Communication by and/or between any components of the system and/or other suitable components can include wireless communication (e.g., Bluetooth, Bluetooth Low Energy, WiFi, radiofrequency, etc.) and/or wired communication. Any components of the system, and/or any portions of the method 100 can apply employ machine learning approaches including any one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and/or any suitable form of machine learning algorithm. However, the system 200 can be configured in any suitable manner.

Although omitted for conciseness, the preferred embodiments include every combination and permutation of the various system components and the various method processes, where the method processes can be performed in any suitable order, sequentially or concurrently.

The system and method 100 and variations thereof can be embodied and/or implemented at least in part as a machine configured to receive a computer-readable medium storing computer-readable instructions. The instructions are preferably executed by computer-executable components preferably integrated with the system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for improved content delivery to a user device, the system comprising:
   a first beacon comprising a sensor, the first beacon configured to:
      generate a first uniform resource identifier (URI) based on a generation rule;
      broadcast the first URI to a user device in response to sensor data, sampled by the sensor, satisfying a threshold condition, wherein the user device is configured to access the first URI; and
      generate a new URI based on the generation rule at a predetermined frequency;
   a beacon control system, associated with the first URI, that is configured to:
      store the generation rule;
      receive a resource request, associated with the first URI, from the user device;
      determine a first beacon identifier from the resource request by resolving the first beacon identifier from the resource request using the generation rule, wherein the first beacon identifier is associated with the first beacon;
identify a content URI associated with the first beacon identifier, wherein the content URI is associated with content hosted on a content provider domain; and
transmit a response to the resource request based on the content URI.

2. The system of claim 1, wherein the generation rule comprises a random string generator, wherein each new URI comprises a random string generated by the random string generator.

3. The system of claim 2, wherein the first URI further comprises:
a host domain associated with the beacon control system; and
a broadcast identifier associated with the first beacon and the first beacon identifier.

4. The system of claim 3, wherein each new URI comprises the host domain.

5. The system of claim 1, wherein the sensor comprises a motion sensor sampling first beacon motion, wherein the first beacon broadcasts the first URI in response to first beacon motion exceeding a threshold motion.

6. The system of claim 1, wherein the first URI encodes the sensor data, wherein the beacon control system is further configured to determine the sensor data from the resource request and store the sensor data in association with the first beacon identifier.

7. The system of claim 1, wherein the response comprises a description of the content, wherein the beacon control system is further configured to:
receive a content request from the user device based on the response;
retrieve the content from the content URI; and
present the content in response to receipt of the content request.

8. The system of claim 7, wherein the beacon control system is further configured to:
determine a set of analytics metrics for the content URI, the set of analytics metrics associated with presentation of the content during a time period;
determine a correlation between the set of analytics metrics and a set of beacon data for the first beacon associated with the time period, wherein the set of beacon data is determined from received resource requests associated with the first beacon; and
select the content URI from a set of candidate URIs associated with the first beacon identifier based on the correlation.

9. The system of claim 1, wherein the beacon control system is further configured to:
receive a second content URI in association with the first beacon identifier;
receive a second resource request associated with the first URI, after receiving the resource request; and
transmit a response to the resource request based on the second content URI.

10. A method for improved content delivery, using a system including: a beacon control system, and a beacon including a sensor, the method comprising:

at the beacon, regenerating a first uniform resource identifier (URI) based on a generation rule associated with a beacon communication protocol at a predetermined frequency;
in response to sensor data, sampled by the sensor, satisfying a threshold condition, broadcasting the first URI to a user device, wherein the user device accesses the first URI;
at the beacon control system receiving a resource request associated with first URI in response to user device accessing the first URI, wherein the beacon control system is associated with the first URI;
at the beacon control system, extracting a beacon identifier from the resource request based on the generation rule, wherein the beacon control system stores the generation rule;
determining a content URI associated with the beacon identifier; and
returning a response, associated with the content URI, in response to the resource request.

11. The method of claim 10, further comprising:
receiving a new content URI in association with the beacon identifier;
receiving a subsequent resource request associated with the first URI; and
returning a second response associated with the new content URI in response to the subsequent resource request.

12. The method of claim 11, wherein the predetermined frequency is faster than a refresh frequency.

13. The method of claim 12, wherein the first URI comprises a random string generated based on the generation rule.

14. The method of claim 13, wherein the first URI further comprises a host domain, wherein each regenerated first URI comprises the host domain.

15. The method of claim 14, wherein:
the beacon, identified by the beacon identifier, regenerates and broadcasts the first URI, wherein the first URI comprises a broadcast identifier determined based on the beacon identifier;
the beacon control system, remote from the beacon and the user device and associated with the host domain, receives the resource request, determines the content URI, and returns the response.

16. The method of claim 10, further comprising:
receiving a content request from the user device based on the response;
retrieving content from the content URI, wherein the content hosted is on a content provider domain associated with the content URI; and
presenting the content in response to receipt of the content request.

17. The method of claim 10, further comprising:
receiving multiple resource requests from the user device within a predetermined time window, wherein each resource request is associated with a different beacon identifier, wherein each beacon identifier is associated with a different physical location; and
determining a user device location based on the physical locations associated with each of the different beacon identifiers.

* * * * *